United States Patent
Connell

(10) Patent No.: US 8,443,916 B2
(45) Date of Patent: May 21, 2013

(54) HOSE TENSIONER FOR A ROCK DRILL SYSTEM

(75) Inventor: Stuart A. Connell, Sherman, TX (US)

(73) Assignee: Caterpillar Global Mining Equipment LLC, South Milwaukee, WI (US)

( * ) Notice: Subject to any disclaimer, the term of this patent is extended or adjusted under 35 U.S.C. 154(b) by 364 days.

(21) Appl. No.: 12/640,546

(22) Filed: Dec. 17, 2009

(65) Prior Publication Data

US 2011/0147092 A1  Jun. 23, 2011

(51) Int. Cl.
*E21B 19/08* (2006.01)
(52) U.S. Cl.
USPC .......................................... 175/162; 175/122
(58) Field of Classification Search .................... 248/49, 248/51, 52, 70, 82; 242/615.1; 173/1, 39, 173/44; 175/162, 57
See application file for complete search history.

(56) References Cited

U.S. PATENT DOCUMENTS

| 1,482,396 | A | * | 2/1924 | Hansen | 173/45 |
| 3,162,253 | A | * | 12/1964 | Curtis | 173/147 |
| 3,500,941 | A | | 3/1970 | Rudman | |
| 3,692,124 | A | | 9/1972 | Kimber et al. | |
| 3,744,575 | A | | 7/1973 | Strommes | |
| 4,039,032 | A | | 8/1977 | Morrison | |
| 4,069,877 | A | | 1/1978 | Durand | |
| 4,540,017 | A | * | 9/1985 | Prange | 137/355.12 |
| 5,050,688 | A | | 9/1991 | Patterson | |

FOREIGN PATENT DOCUMENTS

DE  1256972 B   12/1967
DE  3220181 A1 * 12/1983

* cited by examiner

*Primary Examiner* — Giovanna Wright
*Assistant Examiner* — Ronald Runyan
(74) *Attorney, Agent, or Firm* — Foley & Lardner LLP

(57) ABSTRACT

A rock drill system may include a support arrangement including a feed channel, a rock drill assembly movably associated with the feed channel, and a fluid conductor having a first end connected to the rock drill assembly and a second end associated with the support arrangement. The system may further include a tensioning arm pivotally coupled to the support arrangement, wherein the tensioning arm is engageable with the fluid conductor to tension the fluid conductor.

16 Claims, 4 Drawing Sheets

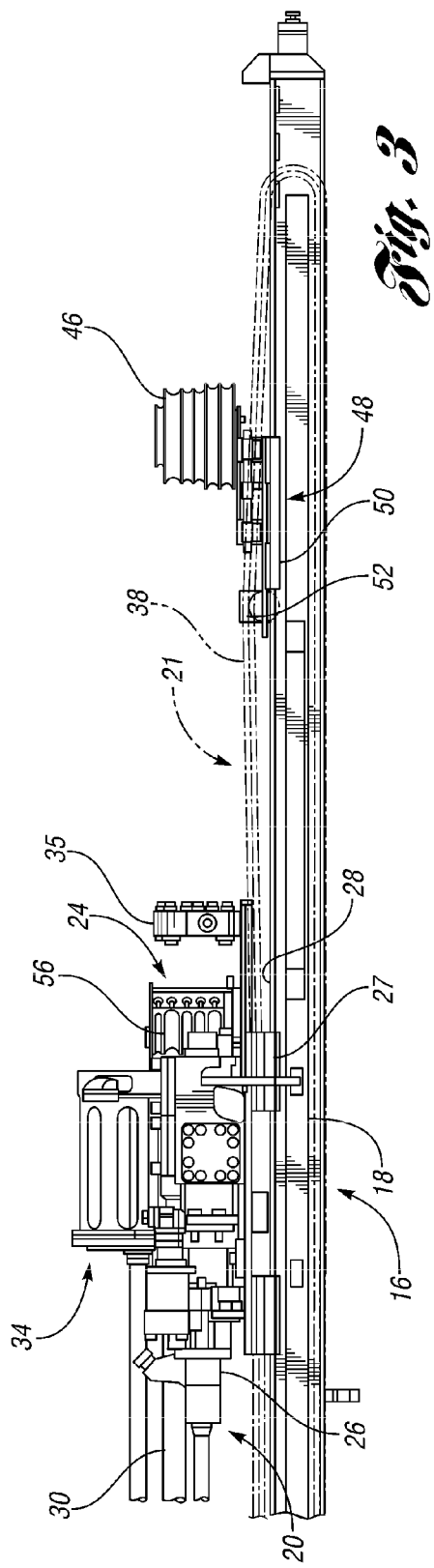
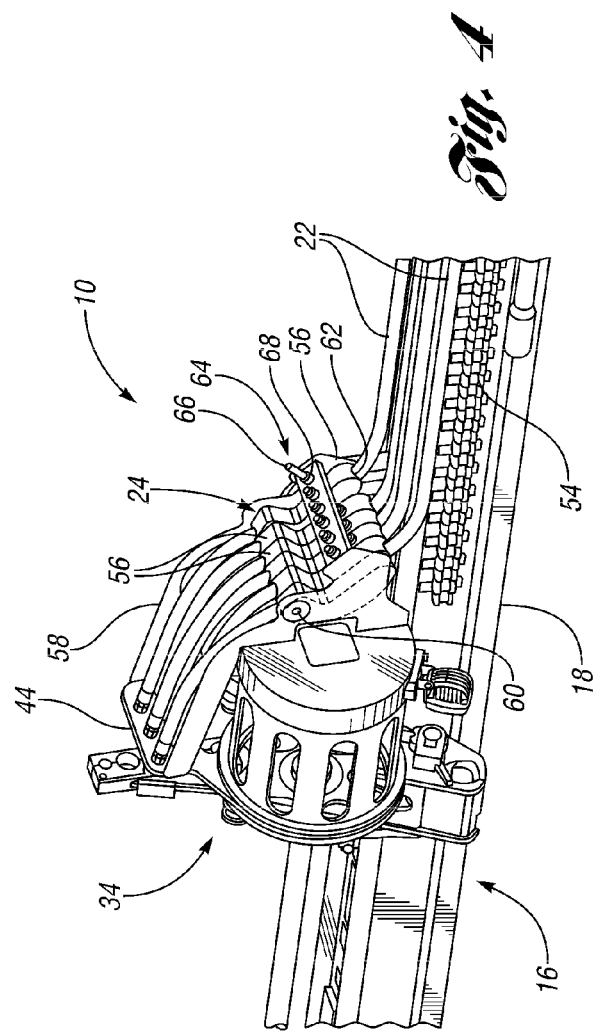

US 8,443,916 B2

HOSE TENSIONER FOR A ROCK DRILL SYSTEM

BACKGROUND

1. Field

The disclosure relates to an apparatus and method for tensioning a hose for a rock drill system.

2. Background Art

A rock drill system may include a rock drill assembly slidably mounted on a feed channel, and multiple hoses for supplying media, such as hydraulic oil and lubricant, to the rock drill assembly. The hoses typically have different diameters and may be guided along the feed channel over a hose drum, sheave or rollers. Such techniques for guiding the hoses are usually provided so that the hoses do not tangle or snag on components associated with the feed channel. It is desirable to maintain tension on the hoses to keep the hoses running in grooves in the drum, sheave or rollers.

A prior technique for tensioning hoses involves using adjustment nuts that are threaded onto long threaded tubes, which tubes are connected to end fittings of the hoses and extend through openings in a support bracket. The nuts may be rotated to thereby pull on the threaded tubes. As a result, tension on the hoses may be increased. During this process, however, the hoses may be also be pulled over fixed, semi-circular structures, which may retard movement of the hoses and thereby reduce tension.

Another prior method of tensioning hoses involves one person pulling on one end of each hose, and another person tightening a stationary hose clamp around the other end of each hose. Because the hoses typically expand or contract due to internal pressure, it is difficult to keep the hose clamps tight on the hoses.

Still another prior method of tensioning a hose involves one person pulling on one end of the hose, and another person tightening a collar that is positioned on an opposite end of the hose. As a result, the opposite end of the hose is pulled against a tube structure through which the hose extends, thereby holding the opposite end of the hose in place.

SUMMARY

A rock drill system according to the present disclosure may include a support arrangement including a feed channel, a rock drill assembly movably associated with the feed channel, and a fluid conductor having a first end connected to the rock drill assembly and a second end associated with the support arrangement. The system may further include a tensioning arm pivotally coupled to the support arrangement, wherein the tensioning arm is engageable with the fluid conductor to tension the fluid conductor.

A method is also disclosed for tensioning a fluid conductor of a rock drill system that includes a support arrangement and a rock drill assembly movably coupled to the support arrangement, wherein the fluid conductor has an end connected to the rock drill assembly. The method includes pivoting a tensioning arm that is pivotally coupled to the support arrangement such that the tensioning arm applies a tensioning force on the fluid conductor.

Another rock drill system according to the disclosure includes a support arrangement including a feed channel, a rock drill assembly movably associated with the feed channel, and a fluid conductor having a first end connected to the rock drill assembly and a second end associated with the support arrangement. The rock drill system further includes a tensioning member movably associated with the support arrangement. The tensioning member is engageable with the fluid conductor to deflect the fluid conductor and thereby tension the fluid conductor.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 3 is a fragmentary side view of the rock drill system of FIG. 2 with the fluid conductors removed for clarity purposes;

FIG. 4 is an enlarged fragmentary perspective view of the rock drill system of FIG. 2 showing the tensioning arms and associated adjustment members;

DETAILED DESCRIPTION

The present disclosure describes various apparatuses and methods for tensioning a fluid conductor of a rock drill system. Several specific embodiments are set forth in the following description and in FIGS. 1-8 to provide a thorough understanding of certain embodiments according to the present disclosure. As those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without several of the specific features explained in the following description.

Figure 1:
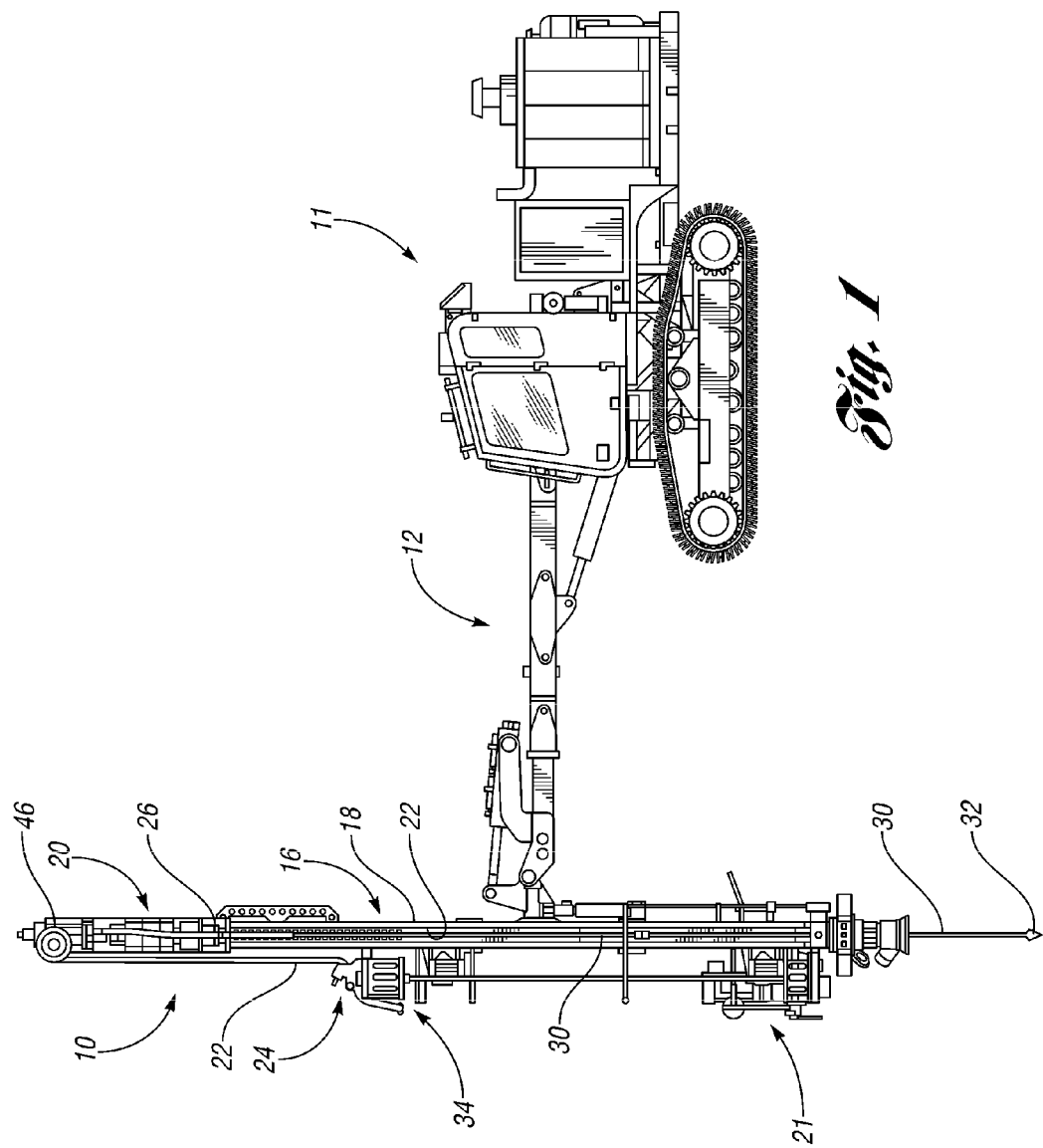
FIG. 1 is a side view of a rock drill system mounted on a movable vehicle.

FIG. 1 shows an embodiment of a rock drill system 10 in accordance with the present disclosure. The rock drill system 10 may be used, for example, to drill holes into rock formations or any other material. Furthermore, holes may be drilled vertically, horizontally, or at any suitable angle.

The rock drill system 10 shown in FIG. 1 is a portable system mounted on a vehicle 11, such as tracked utility vehicle, wheeled vehicle, or any other suitable vehicle, via a pivotable or otherwise movable boom 12. The rock drill system 10 may also be pivotally or otherwise movably mounted to the boom 12 so that the rock drill system 10 may positioned at any suitable angle with respect to the boom 12. As another example, the rock drill system 10 may be mounted on a fixed structure, such as a stationary frame, via a movable boom.

Figure 2:
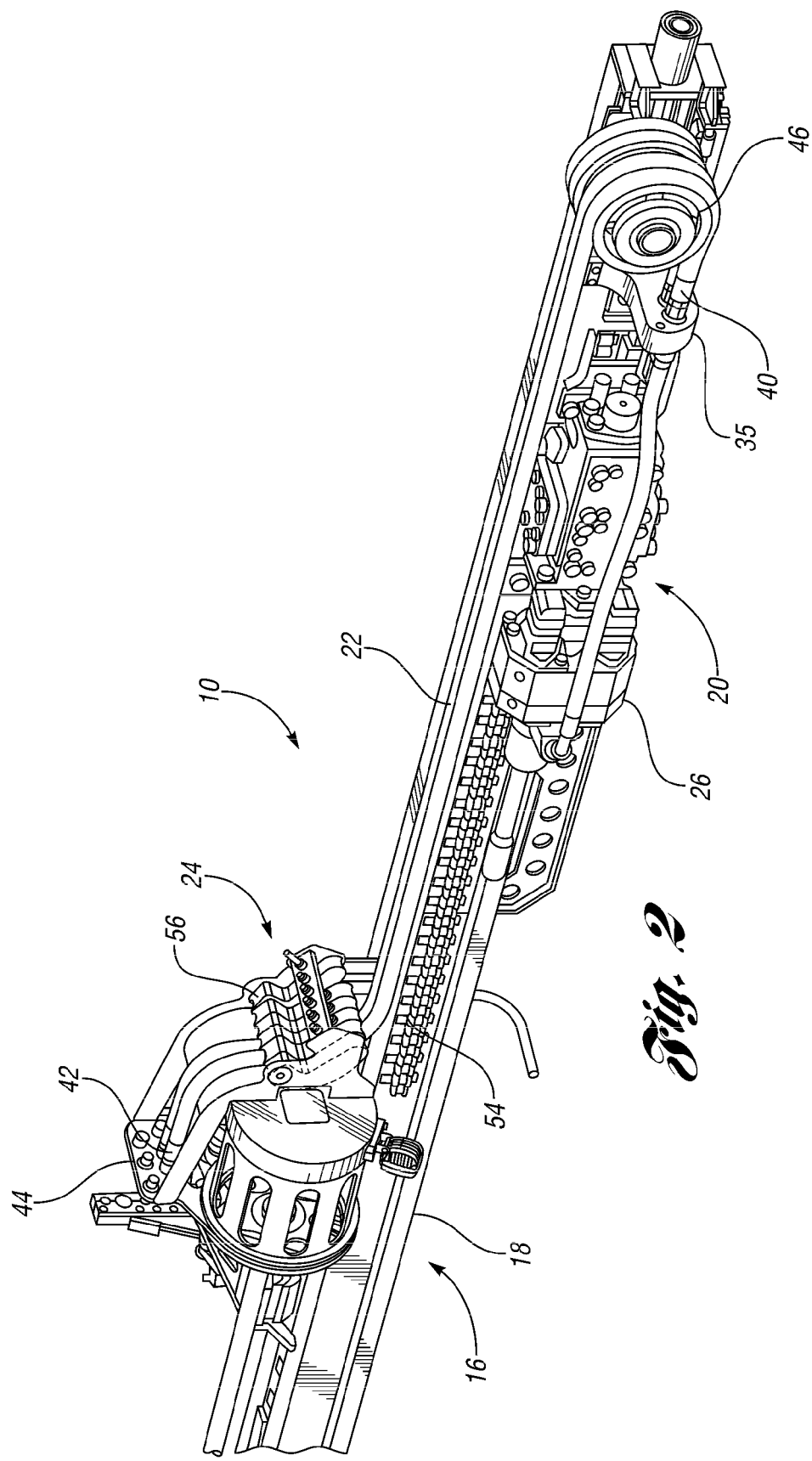
FIG. 2 is a fragmentary perspective view of the rock drill system of FIG. 1, wherein the rock drill system includes a rock drill assembly movably mounted on a support arrangement, multiple fluid conductors connected to the rock drill assembly, and multiple tensioning arms for tensioning the fluid conductors.

Referring to FIGS. 1-3, the rock drill system 10 includes a support arrangement 16 having a feed channel 18, a rock drill assembly 20 movably associated with the feed channel 18, and a drive system 21 for moving the rock drill assembly 20 along the feed channel 18. The rock drill system 10 further includes one or more fluid conductors 22, such as hoses, associated with the rock drill assembly 20 for conveying media toward and/or away from the rock drill assembly 20, and a tensioning arrangement 24 for tensioning the fluid conductors 22.

The rock drill assembly 20 includes a rock drill 26 mounted on a drill slide bracket 27 (best shown in FIG. 3), which may be slidably mounted on one or more guide rails 28 of the feed channel 18. One or more drill rods 30 may be removably coupled to the rock drill 26, along with an associated drill bit 32 coupled to an end of one of the drill rods 30. The rock drill 28 is configured to sufficiently move the drill rods 30 and drill bit 32 so that the drill bit 32 can fracture or otherwise break up rock or other material to form a hole. The rock drill 26 may also slide along the feed channel 18 to move the drill bit 32 downward, for example, so that the drill bit 32 can make the hole deeper. When the rock drill 26 reaches an end, such as a lower end, of the feed channel 18, the rock drill 26 may be disconnected from the one or more drill rods 30 and moved to an opposite end of the feed channel 18. Another drill rod 30 may then be connected between the rock drill 26 and the existing drill rods 30, and drilling may resume. In that regard, the rock drill system 10 may include a rotatable rod carousel arrangement 34 that holds one or more drill rods 30 and that may be rotated to position an additional rod 30 between the rock drill 26 and the existing drill rods 30.

The rock drill assembly 20 further includes a connection section 35, such as a manifold or bulkhead, connected to the rock drill 26 for receiving the fluid conductors 22 (only two fluid conductors 22 are shown in FIG. 2 for clarity purposes, but the illustrated embodiment can accommodate up to six fluid conductors 22). The fluid conductors 22 may supply media to or remove media from the rock drill 26. For example, the rock drill system 10 may include one or more flushing fluid conductors 22 that supply pressurized air or water to the rock drill 26, one or more supply fluid conductors 22 that supply pressurized hydraulic oil to the rock drill 26, one or more return fluid conductors 22 that remove hydraulic oil from the rock drill 26, and one or more lubrication fluid conductors 22 that supply lubricating fluid to the rock drill 26 or other components. Such media may be conveyed to or from the fluid conductors 22 via other fluid conductors that extend to other components of the rock drill system 10, such as pumps, reservoirs, etc.

Referring to FIG. 3, drive system 21 may be any suitable system for moving the rock drill assembly 20 along the feed channel 18. For example, the drive system 21 may be a chain drive system including a chain 38 having first and second ends connected to opposite ends of the rock drill assembly 20. The chain 38 and rock drill assembly 20 may form a loop with the chain 38 wrapping around a drive sprocket and one or more additional sprockets, such as an idler sprocket and a drive idler sprocket. The drive sprocket may be driven by a motor, such as an electric motor or hydraulic motor, causing the chain 38 and rock drill assembly 20 to move.

As the rock drill assembly 20 moves, the fluid conductors 22 connected to the connection section 35 of the rock drill assembly 20 also move. In that regard, referring to FIG. 2, each fluid conductor 22 has a first end 40 fixedly connected to the connection section 35 and an opposite second end 42 fixedly connected to or otherwise associated with the support arrangement 16. For example, each first end 40 may include a threaded fitting that is connected to a threaded fitting on the connection section 35 of the rock drill assembly 20, and each second end 42 may include a threaded fitting that is connected to a threaded fitting on a bulkhead 44 of the support arrangement 16. Furthermore, the fluid conductors 22 extend around a guide arrangement, such as one or more drums, sheaves or rollers, movable mounted on the feed channel 18. In the embodiment shown in FIGS. 2 and 3, the guide arrangement includes a drum 46 that is rotatable and translatable with respect to the feed channel 18, and that includes multiple grooves for receiving the fluid conductors 22.

As the rock drill assembly 20 translates a particular distance with respect to the feed channel 18, the drum 46 may be configured to translate a portion of that distance so that the length of the fluid conductors 22 may remain constant. For example, the rock drill system 10 may include a reduction mechanism, such as a sprocket-chain reduction mechanism, that enables the drum 46 to move a portion, such as half, of the distance that the rock drill assembly 20 moves. As a more detailed example, referring FIG. 3, the drum 46 may be mounted on a drum slide assembly 48 including a drum slide 50 and a reduction sprocket 52 that is rotatably mounted on the drum slide 50 and that extends between the drive system chain 38 and a fixed section of chain 54 (shown in FIG. 2) mounted on the feed channel 18. When the chain 38 is moved in order to move the rock drill assembly 20, the reduction sprocket 52 moves along the fixed chain section 54 and slides the drum slide 50 and drum 46 along the feed channel 18.

Referring to FIGS. 2-4, the tensioning arrangement 24 includes one or more tensioning members, such as tensioning arms 56, movably associated with the support arrangement 16 and configured to maintain tension on the fluid conductors 22 as the rock drill assembly 20 and drum 46 move along the feed channel 18. As a result, the fluid conductors 22 may remain in the grooves of the drum 46 during operation of the rock drill system 10.

In the embodiment shown in FIGS. 2-4, the tensioning arrangement 24 includes a separate arcuate shaped tensioning arm 56 for each fluid conductor 22, and the tensioning arms 56 are independently adjustable. Each tensioning arm 56 is pivotally coupled to the support arrangement 16 and is engageable with a respective fluid conductor 22 to tension the fluid conductor 22 as explained below in detail. Referring to FIG. 4, for example, each tensioning arm 56 may be pivotally coupled to a carousel mount, such as an upper carousel mount 58 that mounts the carousel arrangement 34 to the feed channel 18. More specifically, the tensioning arms 56 may be pivotally mounted on a pivot rod 60 that is attached to the carousel mount 58, such that the tensioning arms 56 are pivotable about a pivot axis that extends through the pivot rod 60.

Each tensioning arm 56 may also be provided with a groove or channel 62 for receiving a respective fluid conductor 22. The channels 62 may also vary in size to accommodate different diameters of the fluid conductors 22.

Figure 5:
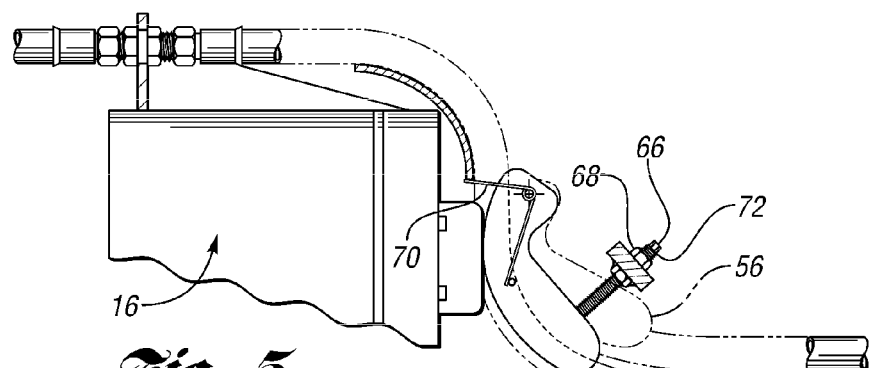
FIG. 5 is an enlarged view of one of the tensioning arms showing first and second positions of the tensioning arm.

In addition, the tensioning arrangement 24 may include one or more adjustment members 64 associated with the one or more tensioning arms 56 for adjusting position of the tensioning arms 56. In the embodiment shown in FIG. 4, the tensioning arrangement 24 includes a separate adjustment member 64 for each tensioning arm 56. Furthermore, each adjustment member 64 may include an adjustable threaded member, such as a screw 66, that is engageable with a respective tensioning arm 56, and a locking member, such as a lock nut 68 for locking a position of the associated screw 66. The screws 66 extend through threaded openings formed in the carousel mount 58 or other portion of the support arrangement 16, and each screw 66 may be rotated to cause the associated tensioning arm 56 to pivot with respect to the support arrangement 16 and apply tension on the associated fluid conductor 22. Referring to FIG. 5, for example, each tensioning arm 56 may move from a first position (shown in phantom lines) to a second position (shown in solid lines) to thereby move a respective fluid conductor 22 from an untensioned or partially tensioned position to a tensioned position. Furthermore, each lock nut 68 may be moved away from the support arrangement 16, as necessary, so that the associated screw 66 may be extended further toward the associated tensioning arm 56.

In the embodiment shown in FIGS. 4 and 5, each screw 66 engages a portion of a respective tensioning arm 56 that is distal with respect to the associated pivot axis. In another embodiment, each screw 66 may engage a portion of a respective tensioning arm 56 that is proximate the pivot axis.

A biasing member, such as a torsion spring 70, may also be provided for each tensioning arm 56 to urge the tensioning arm 56 away from the associated fluid conductor 28 when the associated screw 66 is moved away from the tensioning arm 56. For example, each torsion spring 70 may have one end engaged with the carousel mount 58 or other portion of the support arrangement 16, and an opposite end engaged with a respective tensioning arm 56.

The adjustment members 64 may also be configured to indicate allowable stretch for the fluid conductors 22. For example, each screw 66 may be provided with a mark or other indicator that when aligned with another feature or component, such as a top portion of the associated lock nut 68, indicates that a predetermined maximum amount of stretch (e.g., 1 to 1.5%) of the associated fluid conductor 22 has been reached. As another example, referring to FIG. 5, each screw 66 may be sized such that when an end 72 of the threaded portion is aligned with the top portion of the associated lock nut 68, a predetermined maximum amount of stretch of the associated fluid conductor 22 has been reached.

Figure 6:
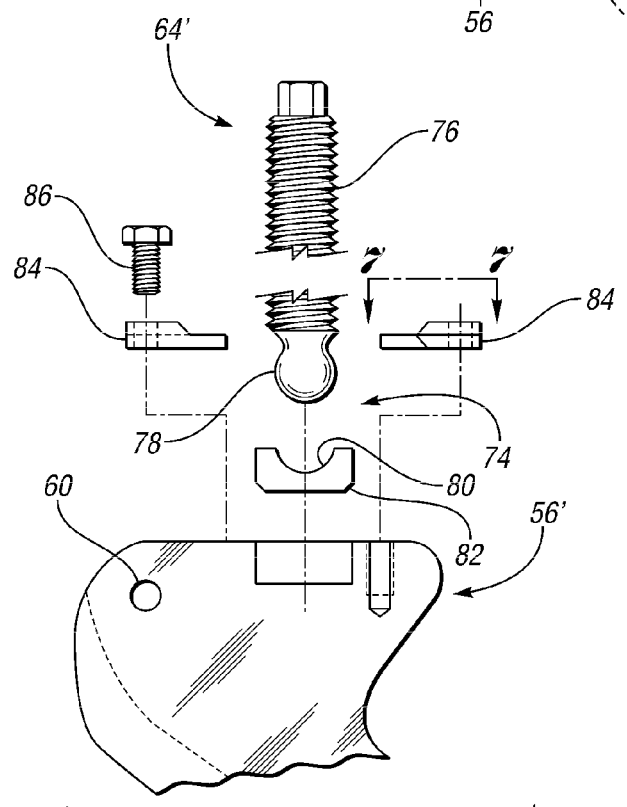
FIG. 6 is an exploded fragmentary side view of another embodiment of a tensioning arm and adjustment member according to the present disclosure.
Figure 7:
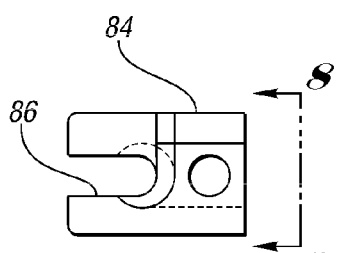
FIG. 7 is a top view of a plate used to join the tensioning arm and adjustment member shown in FIG. 6.
Figure 8:
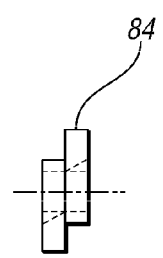
FIG. 8 is an end view of the plate of FIG. 7.

FIG. 6 shows another embodiment of a tensioning arm 56' and adjustment member 64' according to the present disclosure. The tensioning arm 56' and adjustment member 64' are connected together with a joint arrangement, such as a ball and socket arrangement 74 that enables the tensioning arm 56' to be moved with the adjustment member 64' toward and away from the associated fluid conductor 22. For example, the adjustment member 64' may include a threaded adjustment screw 76 having a ball 78 that is received in a socket 80 formed in or otherwise provided on the tensioning arm 56'. In the embodiment shown in FIG. 6, for example, the socket 80 is formed in a socket member 82 that is connected to the tensioning arm 56', such as with adhesive or by any other suitable means. The ball 78 may also be captured by one or more plates 84 that are connected to the tensioning arm 56' with one or more fasteners 86, for example. Referring to FIG. 7, each plate 84 may have a suitably sized aperture 86 so that the plates 84 may be positioned around the adjustment screw 76.

In the embodiment shown in FIG. 6, the adjustment screw 76 is coupled to the tensioning arm 56' proximate a pivot axis or pivot point 88 about which the tensioning arm 56' may pivot. In another embodiment, the adjustment screw 76 may be coupled to the tensioning arm 56' at a position that is distal with respect to the pivot point 88.

Any of the above described tensioning arrangements may allow a single person to adjust the tension on one or more fluid conductors. Furthermore, each tensioning arm may be configured to push or deflect a respective fluid conductor out of an initial direct line between two points, or further away from such a line, thereby changing the overall length of the fluid conductor and introducing tension into the fluid conductor. In that regard, each tensioning arm may exert a force on a respective fluid conductor in a direction that extends at an angle with respect to a longitudinal axis of the fluid conductor. For example, each tensioning arm may exert a force on a respective fluid conductor in a direction generally transverse to a longitudinal axis of a section of the fluid conductor engaged by the tensioning arm.

Furthermore, the tensioning arrangement components may be made of any suitable material and in any suitable manner. For example, any of the above described tensioning arms may be made of stamped or molded metal, or molded plastic.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A rock drill system comprising:
   a support arrangement including a feed channel;
   a rock drill assembly movably associated with the feed channel;
   a fluid conductor having a first end connected to the rock drill assembly and a second end associated with the support arrangement;
   a tensioning arm pivotally coupled to the support arrangement, the tensioning arm being engageable with the fluid conductor to tension the fluid conductor; and
   a biasing member associated with the tensioning arm for biasing the tensioning arm away from the fluid conductor.

2. The system of claim 1 wherein the tensioning arm has a groove for receiving the fluid conductor.

3. The system of claim 1 wherein said tensioning arm is movably associated with the support arrangement, the tensioning arm being engageable with the fluid conductor to deflect the fluid conductor and thereby tension the fluid conductor.

4. The rock drill system of claim 3 further comprising an adjustment member associated with the tensioning member for adjusting position of the tensioning member.

5. The rock drill system of claim 4 wherein the adjustment member is coupled to the tensioning member such that the adjustment member is rotatable with respect to the tensioning member.

6. A rock drill system comprising:
   a support arrangement including a feed channel;
   a rock drill assembly movably associated with the feed channel;
   a fluid conductor having a first end connected to the rock drill assembly and a second end associated with the support arrangement;
   a tensioning arrangement comprising a tensioning arm pivotally coupled to the support arrangement, the tensioning arm being engageable with the fluid conductor to tension the fluid conductor; and
   an adjustment member associated with the tensioning arm for adjusting the tensioning arm, the adjustment member having an indicator that indicates when a predetermined maximum amount of stretch of the fluid conductor has been reached.

7. The system of claim 6 wherein the adjustment member is configured to move the tensioning arm toward the fluid conductor and away from the fluid conductor.

8. The system of claim 6 wherein the adjustment member is connected to the tensioning arm with a ball and socket arrangement.

9. The system of claim 6 wherein the indicator comprises a mark on the adjustment member that is configured to align with a portion of the tensioning arrangement when maximum amount of stretch of the fluid conductor has been reached.

10. A rock drill system comprising:
   a support arrangement including a feed channel;
   a rock drill assembly movably associated with the feed channel;
   a plurality of fluid conductors having a first end connected to the rock drill assembly and a second end associated with the support arrangement;
   a plurality of tensioning arms pivotally coupled to the support arrangement, the tensioning arms being engageable with the fluid conductor to tension the fluid conductor;
   each fluid conductor comprising a hose, and each tensioning arm being engageable with a respective hose to tension the respective hose; and
   multiple biasing members associated with the tensioning arms, each biasing member being configured to bias a respective tensioning arm away from a respective hose.

11. The system of claim 10 wherein the tensioning arms are independently pivotable.

12. The system of claim 10 further including multiple adjustment members associated with the tensioning arms, each adjustment member being configured to adjust a respective tensioning arm to tension a respective hose.

13. The system of claim 12 wherein each adjustment member is configured to move a respective tensioning arm toward and away from a respective hose.

14. The system of claim 12 wherein each adjustment member is connected to a respective tensioning arm with a ball and socket arrangement.

15. The system of claim 12 wherein each adjustment member is configured to indicate allowable stretch for a respective hose.

16. The system of claim 10 wherein each tensioning arm has a groove for receiving one of the hoses.

* * * * *